Oct. 27, 1942.    G. V. SUMNER ET AL    2,300,182
CAKE KNOCKER
Filed April 25, 1941    2 Sheets-Sheet 1
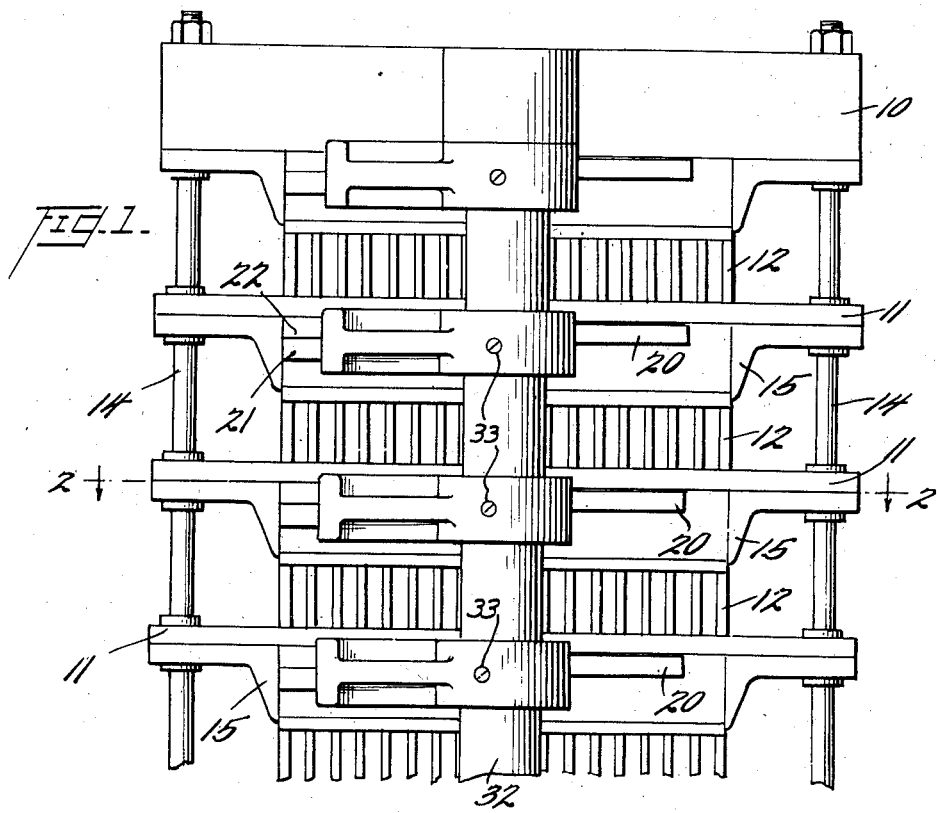
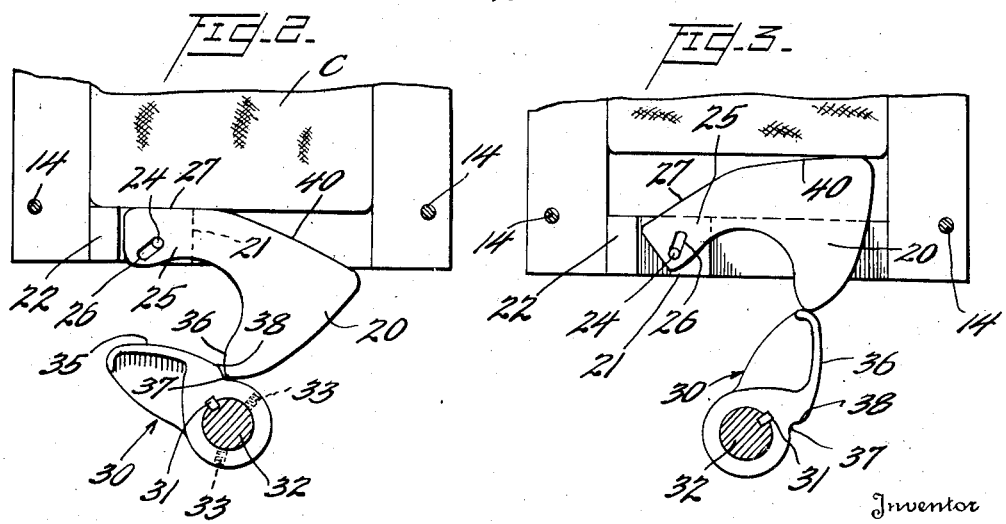
Inventor
George V. Sumner
Edward B. Branch
By Watson, Cole, Grindle & Watson
Attorney

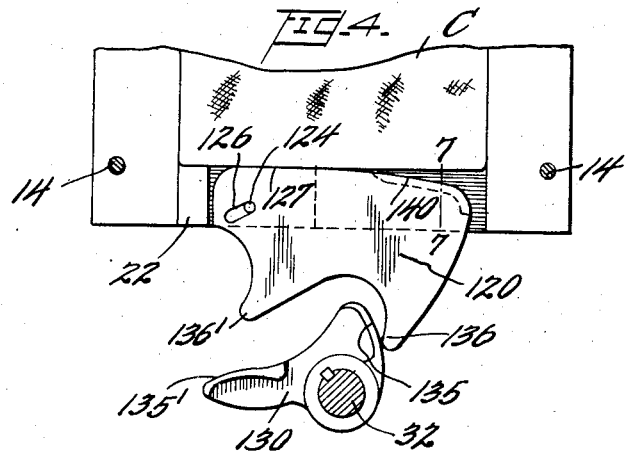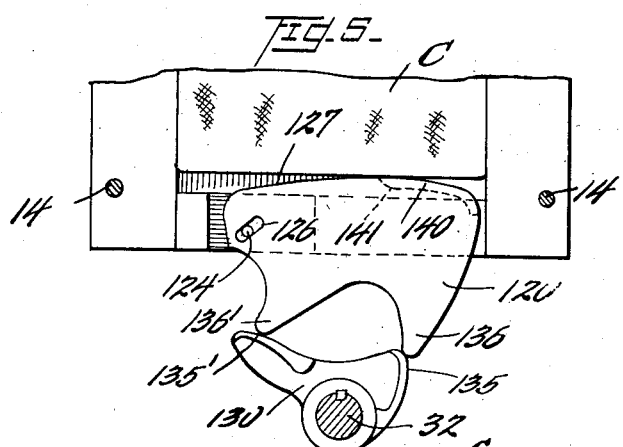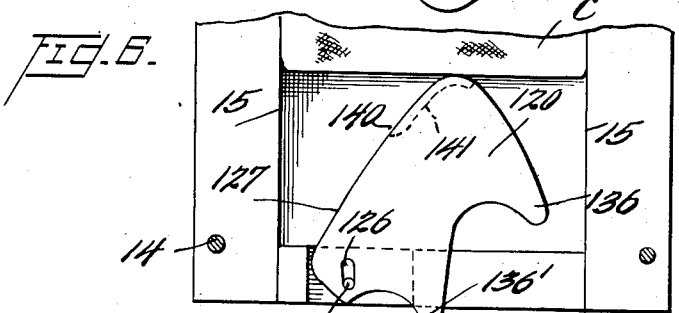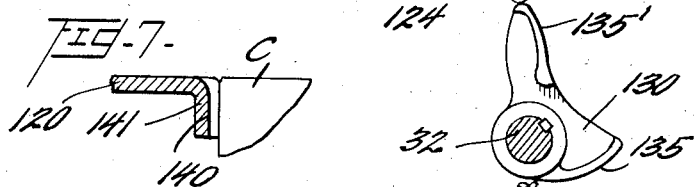

Patented Oct. 27, 1942

2,300,182

UNITED STATES PATENT OFFICE 2,300,182

CAKE KNOCKER

George V. Sumner, Columbia, S. C., and Edward B. Branch, Atlanta, Ga.

Application April 25, 1941, Serial No. 390,431

15 Claims. (Cl. 100—50)

This invention relates to oil mill presses and more particularly to means embodied in or attached to such presses for facilitating the handling, insertion, and removal of the oil cake.

The general object of the invention is to provide a novel and improved device for dislodging or ejecting the pressed oil cake from an oil mill press (commonly called a "cake knocker"), which is of simple but practical construction, and which is easy and economical to manufacture and operate.

Another object of the invention is to provide a cake knocker, which is adapted to exert the strongest pressure against the cake during an initial period of relatively slow movement in order to dislodge the cake from the platen of the press and thereafter to apply less pressure during a period of increased speed of movement.

A further object of the invention is the provision of a cake knocker or ejector which is provided with individual cake contacting members which are so constructed and arranged as to provide gauging means for positioning the next series of cakes upon the platens.

A still further object of the invention is the provision in a device of this kind, of cake ejecting members or pushers which are adapted to have rolling contact with the edges of the cakes whereby undue rubbing friction against the filter cloth in which the cake is wrapped is obviated.

The invention, in its preferred embodiments, contemplates the provision of a series of cake pushers, each pivotally and slidably mounted adjacent the rear edge of one of the platens of an oil press, and operated—preferably by cam action—to roll against the rear edge of the cake, after the pressing operation is completed and the platens separated. The actuating cams are preferably all carried by or fixed to a vertical shaft which may be rotated by a suitable source of power, and the pushers and cams are so shaped as to afford the greatest amount of leverage at the beginning of the ejecting operation, whereby the cakes may be dislodged from the platens to which they adhere without damage, and thereafter ejected from the press at an increased speed of movement, but without the necessity of exerting any great pressure.

In one exemplary form of the invention as disclosed herein, a single lobed cam is arranged to move against a pusher member also having but a single lobe, the curvature of these coacting lobes being such as to apply the varying force and speed of movement to the pusher. In another embodiment illustrated herein by way of example, the cam element and the pusher member each have two coacting lobes or projections, one cooperating pair of which serve to initiate the movement of the pusher by applying the greater force, and the other pair come into action later to move the pusher at a greater rate of speed but with less mechanical advantage during the later portions of the ejecting movement.

Other objects and features of novelty will be apparent from the following specification when read in connection with the accompanying drawings, in which certain embodiments of the invention are illustration by way of example.

In the drawings:

Figure 1 is a view in rear elevation of the upper part of an oil press embodying the principles of the invention;

Figures 2 and 3 are fragmentary horizontal sectional views, on a somewhat smaller scale, of the rear portion of the press taken substantially on line 2—2 of Figure 1, these views showing respectively the cam and pusher elements as they appear in the two extreme positions of the latter;

Figures 4, 5, and 6 are similar views showing three successive positions of operation of the pusher and cam actuator in another embodiment of the invention; and Figure 7 is a fragmentary vertical sectional view taken on line 7—7 of Figure 4.

In Figure 1 of the drawings there is shown, somewhat diagrammatically, an oil press which is representative of presses to which the present invention may be applied. Obviously, this press is chosen for purposes of illustration only and the invention can be applied to many other types of press without substantial modification. In Figure 1 the upper crosshead of the press is designated by the reference numeral 10 and, as in the usual case, is somewhat heavier than the successive lower plates or platens 11 of which there may be any desired number arranged in spaced relationship from the top to the bottom of the press. Each of the platens 11 serves to support a press box 12 which may be of any desired construction and designed to receive the oil which is pressed or squeezed from the oil seed cake disposed thereon. Each of the platens 11 is provided with registering openings for the reception of the columns or guide posts 14 of which there are usually four. Suitable mechanism (not shown) is provided for maintaining the platens 11 at an approximately equal distance apart during the pressing operation. This mechanism may consist of linkages supporting the platens one from the other, or any other suitable means may be provided. Each platen, adjacent its undersurface near the ends is provided with guides having depending flanges 15 between which the press box 12 upon the next lower platen 11 is adapted to move when the pressing operation is in progress.

The oil seed cake (designated C) wrapped in the usual filter cloth is placed upon the boxes 12 and is disposed between these boxes and the overlying platen 11. When all of the cakes have been placed in position, the press is set in operation and the cakes are squeezed between the platens 11 and the press boxes 12 and the expressed oil is received in the boxes. After the pressing operation is completed, the platens are separated so that the oil cake may be removed therefrom. In order to facilitate the removal of the cake there is provided by the present invention the novel cake knocker arrangement which is preferably disposed adjacent the rear side of the press and comprises a series of pusher elements 20 movably attached to each of the platens 11 by means of a small bracket or supporting shelf 21 secured to the under-side of each platen 11 and spaced therefrom by means of the spacing insert 22. A vertical pintle 24 extends between each platen 11 and its attached shelf or bracket 21 and serves as a fulcrum or hinge for the pusher member 20. This member 20 has one of its arms 25 provided with a slot 26 through which the pintle 24 extends. The purpose of this pin and slot connection is to provide a certain bodily or translatory movement of the pusher as well as a general pivotal movement, which will hereinafter be described.

In its initial position of rest, the pusher 20 appears as shown in Figure 2 of the drawings and the flat portion 27 of the contact face of the member 20 serves as a gauge for the positioning of the oil cake in the press, preventing the cake from extending too far rearwardly of the press box when it is manually inserted.

In order to actuate the pusher members 20 there are provided a plurality of cam elements 30 which are all keyed as at 31 to a vertical shaft 32 and are further secured thereon against vertical displacement as by means of the set screws 33. Each cam 30 is provided with a widened contact face 35 which is adapted to move against the lobe or nose 36 of the pusher element as it rotates in a clockwise direction as seen in Figure 2. The first point of contact of the cam with the nose of the pusher is just beyond the indentation designated 37 and the rather steep portion 38 on the cam exerts considerable force upon the ejector member 20 at the commencement of its movement against the cake to be ejected.

As the cam 30 continues to rotate, the nose of the pusher member 20 moves along the surface 35 of the cam, the effective leverage or mechanical advantage diminishing at the same time that the speed of movement of the pusher gradually increases. During this movement, the curved surface 40 of the pusher 20 rolls along the rear edge of the cake at the same time that it moves forwardly in order to dislodge the cake from the platen. The final position of the pusher 20 is shown in Figure 3 of the drawings, and it will be seen that during this movement the fulcrum of the pusher 20 has moved from one end of the slot 26 to the other. In this final position, the nose of the cam 30 is passing by the pointed end of the lobe 36 of the pusher member. The cam 30 continues its movement in a clockwise direction, and the pusher member 20 may be returned to its initial position by a spring or any other kind of automatic device (not shown), or it may remain in its ejecting position until the next seed cake C is placed in the press, whereupon the member 20 will be restored to the position shown in Figure 2, the flat surface 27 acting as a guage surface or edge for accurately positioning the cake. The rotation of the cam shaft 32 may be intermittent or continuous; if the latter, the speed of rotation is so regulated that sufficient time is afforded between the successive contacts with the pusher 20 to permit the pressed cake to be removed and a new cake inserted in the press.

The rather powerful pressure applied by the cam to the pusher member during the initial period of movement serves to dislodge the cake from the platen and after a movement of approximately one inch the cake ceases to adhere closely to the platen and during the remainder of the ejector movement, no great pressure is necessary. It will be readily seen that the effective lengths of the lever arms represented by the cam 30 and the pusher member 20, and the shapes of the contacting surfaces, provide for this variation in force and speed of movement of the pusher device.

In Figures 4, 5, and 6 of the drawings, there is illustrated another embodiment of the invention in which both the cam element 130 and the pusher member 120 are provided with two cooperating lobes or projections. The initially contacting lobe of the cam is designated 135 and the secondary lobe or cam arm is designated 135'. The first lobe or projection of the pusher member 120 to be contacted by the cam is designated 136 and the second lobe is designated 136'. The pusher member 120 is provided with a flat gauging surface 127 similar to that shown at 27 in the first embodiment. Similar pin and slot fulcrum connections are provided at 124 and 126. In Figure 4, the initial contact of the cam lobe 135 with the projection 136 of the pusher 120 is shown. As the cam rotates in a clockwise direction, the pusher 120 is forced in a generally counter-clockwise movement about the pin and slot fulcrum. The varying points of contact of the lobe 136 along the cam portion 135 affords an increasing length of cam lever arm until the position shown in Figure 5 of the drawings is reached, whereupon the portion 135 of the lever passes beyond the tip of the lobe 136 of the member 120 and the secondary lever arm 135' comes into contact with the lobe 136' and continues to move the member 120 at an increasing rate of speed against the cake.

The final position of the pusher 120 in ejecting the cake is shown in Figure 6 of the drawings where the cam arm 135' and the second lobe 136' of the member 120 are end to end. By this time, the fulcrum pin 124 is in the opposite end of the slot 126 and the ejecting surface 140 has rolled in contact with the cake until it has dislodged the latter from the platen and pushed it well on its way out of the press. Just as in the preceding embodiment, the pusher member 120 may be automatically returned to its initial position or it may be restored by contact with the next succeeding cake placed between the platens.

At least a portion of the rolling contact surface 140 of the ejector or pusher member 120 is widened vertically as by means of the provision of a flange 141, which insures that the rear edge of the pressed cake is contacted whether or not the cake has fallen away from the upper platen before the pusher reaches the limit of its travel. This arrangement is most clearly shown in Figure 7 of the drawings.

It will be noted that all of the cams 30 and 130 are secured in permanent positions upon the vertical shaft 32 and these positions are so selected as to dispose the cam members opposite the pusher members which they are to actuate, when the platens 11 which carry said pusher members are in at least a partly opened position.

It will be understood that various changes and modifications can be made in the embodiments illustrated and described herein, without departing from the scope of the invention as defined by the following claims.

Having thus described the invention, what is claimed as new and desired to be secured by Letters Patent is:

1. In an oil press of the class described, a series of parallel platens between which oil cake is pressed, a movable ejector member disposed adjacent each of said platens and adapted to dislodge and remove the pressed cake therefrom, and a cam element for actuating each of said ejector members.

2. In an oil press of the class described, a series of parallel platens between which oil cake is pressed, a movable ejector member pivotally mounted upon each of said platens, and adapted to dislodge and remove the pressed cake therefrom.

3. In an oil press of the class described, a series of parallel platens between which oil cake is pressed, a movable ejector member mounted adjacent each platen for combined pivotal and translatory movement for dislodging and removing the pressed cake therefrom, and a cam element for actuating each of said ejector members.

4. In an oil press of the class described, a series of parallel platens between which oil cake is pressed, a movable ejector member disposed adjacent each of said platens for rolling contact with the pressed cake in order to dislodge the cake without injury thereto.

5. In an oil press of the class described, a series of parallel platens between which oil cake is pressed, a movable ejector member mounted by means of a pin and slot connection providing a variable fulcrum arrangement for combined pivotal and translatory movement adjacent each of said platens for rolling contact with the pressed cake in order to dislodge the cake without injury thereto.

6. In an oil press of the class described, a series of parallel platens between which oil cake is pressed, a movable ejector member pivotally mounted upon each of said platens, and adapted to dislodge and remove the pressed cake therefrom, and means for applying a powerful initial force to move said ejector member, which force gradually diminishes in proportion to the distance said member is moved.

7. In an oil press of the class described, a series of parallel platens between which oil cake is pressed, a movable ejector member mounted adjacent each platen for combined pivotal and translatory movement for dislodging and removing the pressed cake therefrom, and a cam element for actuating each of said ejector members, said cams and members being so constructed and arranged that the members are given an initial ejecting movement with relatively great force and at a slow speed, the speed increasing and the force diminishing in proportion to the distance moved.

8. In an oil press of the class described, a series of parallel platens between which oil cake is pressed, a movable ejector member mounted upon each of said platens for rolling contact with the pressed cake in order to dislodge the cake without injury thereto, and means for applying a powerful initial force to move said ejector member, which force gradually diminishes in proportion to the distance said member is moved.

9. In an oil press of the class described, a series of parallel platens between which oil cake is pressed, a movable ejector member pivotally mounted upon each of said platens, and adapted to dislodge and remove the pressed cake therefrom, the surface of said ejector member which initially engages said cake being flat, said member having also a curved surface which engages the cake during the ejecting movement.

10. In an oil press of the class described, a series of parallel platens between which oil cake is pressed, a movable ejector member mounted upon each of said platens for rolling contact with the pressed cake in order to dislodge the cake without injury thereto, each of said members having a flat initial surface for gauging the position of the cakes as they are placed in the press, and a curved contact surface for rolling against the cake during the ejecting movement.

11. In an oil press of the class described, a series of parallel platens between which oil cake is pressed, a shelf carried by each of said platens and spaced from the bottom surface thereof at one edge, a pintle extending between said platen and the shelf, an ejector member pivoted to said pintle and adapted to move in a horizontal plane in the space between said platen and shelf to eject a pressed cake from between the said platen and the one next below.

12. In an oil press of the class described, a series of parallel platens between which oil cake is pressed, a shelf carried by each of said platens and spaced from the bottom surface thereof at one edge, a pintle extending between said platen and the shelf, an ejector member provided with a slot for the reception of said pintle, to provide for combined pivotal and translatory movement of said member in a horizontal plane in the space between said platen and shelf to eject a pressed cake from between the said platen and the one next below.

13. In an oil press of the class described, a series of parallel platens between which oil cake is pressed, a movable ejector member pivotally mounted upon each of said platens, and adapted to dislodge and remove the pressed cake therefrom, a rotatable cam shaft extending transversely to the planes of said platens, a plurality of cams for actuating said members, said cams being fixed to said shaft and spaced apart distances corresponding to the initial spacing of said platens for the insertion and removal of the cakes.

14. In an oil press of the class described, a series of parallel platens between which oil cake is pressed, a movable ejector member disposed adjacent each of said platens and adapted to dislodge and remove the pressed cake therefrom, and a cam element for actuating each of said ejector members, each of the ejector members having two lobes thereon, and each of said cams having two lobes thereon, one of the cam lobes adapted to contact one of the ejector lobes and move it a predetermined distance whereupon the second cam lobe comes into operative contact with the second ejector lobe and moves the member the remaining distance required for ejection.

15. In an oil press of the class described, a series of parallel platens between which oil cake is pressed, a movable ejector member disposed adjacent each of said platens and adapted to dislodge and remove the pressed cake therefrom, and a cam element for actuating each of said ejector members, each of the ejector members having two lobes thereon, and each of said cams having two lobes thereon, one of the cam lobes adapted to contact one of the ejector lobes and move it a predetermined distance whereupon the second cam lobe comes into operative contact with the second ejector lobe and moves the member the remaining distance required for ejection, the first two mating pairs of lobes being so constructed and arranged as to apply a relatively strong force to the cake at a relative slow speed of movement, and the second mating lobes being so constructed and arranged as to continue the operation by the application of reduced force during movement at an increased rate of speed.

GEORGE V. SUMNER.
EDWARD B. BRANCH.